(12) United States Patent
Wang et al.

(10) Patent No.: US 12,517,150 B2
(45) Date of Patent: Jan. 6, 2026

(54) TEST TOOL WITH PROFILING CONNECTOR AND BATTERY TESTING METHOD

(71) Applicant: CONTEMPORARY AMPEREX TECHNOLOGY (HONG KONG) LIMITED, Hong Kong (CN)

(72) Inventors: Haijie Wang, Ningde (CN); Xueqing Gong, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 172 days.

(21) Appl. No.: 18/532,886

(22) Filed: Dec. 7, 2023

(65) Prior Publication Data

US 2024/0103039 A1    Mar. 28, 2024

Related U.S. Application Data

(63) Continuation of application No. PCT/CN2022/124618, filed on Oct. 11, 2022.

(30) Foreign Application Priority Data

Oct. 15, 2021 (CN) .......................... 202122495588.0

(51) Int. Cl.
*G01R 1/067* (2006.01)
*H01M 10/42* (2006.01)

(52) U.S. Cl.
CPC .... *G01R 1/06722* (2013.01); *H01M 10/4285* (2013.01)

(58) Field of Classification Search
CPC ................................................. G01R 1/06722
See application file for complete search history.

(56) References Cited

U.S. PATENT DOCUMENTS

| 4,360,780 A | * 11/1982 | Skutch, Jr. ............. G01R 31/36 |
| | | 324/437 |
| 2001/0048314 A1 | 12/2001 | Haas et al. |

(Continued)

FOREIGN PATENT DOCUMENTS

| CN | 209387805 U | 9/2019 |
| CN | 212160026 U | 12/2020 |

(Continued)

OTHER PUBLICATIONS

The World Intellectual Property Organization (WIPO) International Search Report and Written opinion for PCT/CN2022/124618 Dec. 16, 2022 14 pages (including English translation).

(Continued)

*Primary Examiner* — Paresh Patel
(74) *Attorney, Agent, or Firm* — ANOVA LAW GROUP, PLLC (57) ABSTRACT

A test tool includes an operating portion with a first end used for hand-holding, and a profiling connector adapted to a socket to be detected and plugged. An elastic probe is provided in a jack of the profiling connector, and the profiling connector is arranged at a second end of the operating portion opposite to the first end. The profiling connector is configured to be inserted into the socket by holding the operating portion with hand, with the elastic probe abutting against and electrically connected with a probe in the socket.

12 Claims, 10 Drawing Sheets

(56) References Cited

U.S. PATENT DOCUMENTS

| | | |
|---|---|---|
| 2004/0169517 A1 | 9/2004 | Vang |
| 2016/0091571 A1* | 3/2016 | Salo, III .................. G01R 1/04 324/437 |
| 2018/0011146 A1 | 1/2018 | Chen et al. |
| 2019/0140385 A1* | 5/2019 | Huo ..................... H01R 13/502 |
| 2020/0064407 A1* | 2/2020 | Zhang ................. G01R 31/371 |
| 2021/0123974 A1* | 4/2021 | Li ......................... B60L 3/0046 |

FOREIGN PATENT DOCUMENTS

| | | |
|---|---|---|
| CN | 213364819 U | 6/2021 |
| CN | 216213672 U | 4/2022 |
| EP | 0508030 A1 | 10/1992 |
| WO | 0129930 A1 | 4/2001 |

OTHER PUBLICATIONS

The European Patent Office (Epo) Extended Search Report for EP Application No. 22880299.Aug. 7, 20, 2024 6 Pages.

* cited by examiner

TEST TOOL WITH PROFILING CONNECTOR AND BATTERY TESTING METHOD

CROSS-REFERENCE

The present application is a continuation of International Application No. PCT/CN2022/124618, filed on Oct. 11, 2022, which claims priority to Chinese patent application No. 202122495588.0 filed on Oct. 15, 2021 and entitled "TEST TOOL WITH PROFILING CONNECTOR," the entire contents of both of which are incorporated herein by reference.

TECHNICAL FIELD

The present application relates to the technical field of battery testing, and in particular to a test tool with a profiling connector and a battery testing method.

BACKGROUND

With the rapid development of electric vehicles, power batteries for powering electric vehicles have also been rapidly developed.

In some cases, the battery pack of the power battery is provided with several battery modules. In order to ensure the safety of use, it is needed to collect and monitor the voltage and temperature of the battery modules during use of the power battery. Therefore, when producing power batteries, it is needed to test the working voltage and temperature of the battery module. However, the standard connectors used in the test are not suitable for frequent plugging and unplugging, and can easily be damaged. In addition, these connectors are difficult to plug and unplug during manual operation, and long-term operation will cause serious wear on the operator's fingers.

Therefore, further solutions are needed for the above-mentioned technical problems.

SUMMARY

In view of the above problems, embodiments of the present application provide a test tool with a profiling connector and a battery testing method, which can solve the problems of easily damaged connectors and manual operational difficulties during testing of the working voltage and temperature of battery modules using standard connectors.

In a first aspect, the technical solution adopted in an embodiment of the present application is: a test tool with a profiling connector, including:

an operating portion, a first end of the operating portion being used for hand-holding; and a profiling connector adapted to a socket to be detected and plugged, where an elastic probe is provided in a jack of the profiling connector, and the profiling connector is arranged at the second end of the operating portion opposite to the first end;

in which the profiling connector can be inserted into the socket by holding the operating portion with hand, with the elastic probe abutting against and electrically connected with a probe of the socket.

In the technical solution of the embodiment of the present application, the operating portion can be used for hand-holding, and a profiling connector is provided at the second end of the operating portion, and the profiling connector can be inserted into the socket to be detected and plugged by holding the operating portion with hand, which is convenient for the staff to operate; meanwhile, an elastic probe is provided in the jack of the profiling connector, and once the profiling connector is inserted into the socket to be detected and plugged, the elastic probe elastically abuts against the probe of the socket, thus changing the original sliding friction between the probe of the connector and the probe of the socket into elastic abutment, which effectively avoids damage to the profiling connector caused by repeated plugging and unplugging and improves the service life.

In some embodiments, the test tool with a profiling connector further comprises:

two guide pillars respectively connected with the second end of the operating portion and respectively arranged on two sides of the profiling connector.

In the embodiment of the present application, by adding the guide pillars, when the test tool is operated to plug the profiling connector in the socket, the guide pillars are plugged in the guide jacks on the module frame of the battery module first, so as to enable guidance for inserting the profiling connector into the socket, thus providing the effect of facilitating plugging.

In some embodiments, the operating portion comprises:

a first operating body, a second operating body and an elastic member;

where a first end of the first operating body is used for hand-holding, and a second end thereof is provided with the profiling connector;

a first end of the second operating body is used for hand-holding, and a second end thereof is provided with a hook, where the position of the second operating body near the second end is hinged with the second end of the first operating body, the hook is used to be clamped with the battery module when the profiling connector is inserted into the socket; and the elastic member is arranged between the first operating body and the second operating body so that a preset included angle is formed between the first operating body and the second operating body and is used to provide resilience.

For the operating portion of the embodiment of the present application, after the profiling connector is plugged in, the hook at the second end of the second operating body is clamped with the module frame of the battery module, and under the effect of the elastic member, elastic force acts on the first operating body and the second operating body respectively, so that the profiling connector at the second end of the first operating body is inserted into the socket, and the hook of the second operating body is clamped with the module frame, so that the first operating body and the second operating body are in a state of gripping the module frame, and then the test tool with the profiling connector and the battery module are in a state of relatively stable connection, thereby ensuring stable connection between the profiling connector and the socket.

In some embodiments, a hinge block is connected with a first side face of the first operating body, the first end of the hinge block is aligned with the second end of the first operating body and is provided with a first hinge ring, and the second operating body is provided with a second hinge ring, the first hinge ring and the second hinge ring being hinged via a rotating shaft. In this way, through the arrangement of the hinge block, hinging of the first operating body and the second operating body can be facilitated.

In some embodiments, two hinge blocks are provided and are arranged at an interval;

the second operating body includes two connecting legs, the two connecting legs are each provided with a second hinge ring, and the hook is arranged at a first end of the connecting leg;

In which the two second hinge rings are respectively hinged with the first hinge rings of the two hinge blocks.

The second operating body with the connecting legs facilitates the arrangement of the hook and clamping of the hook to the module frame, and the second operating body in the form of connecting legs can reduce weight and facilitate operation.

In some embodiments, the second operating body further includes a crossbar, and two ends of the crossbar are respectively connected with the second ends of the two connecting legs to form a structure for hand-holding. The frame-shaped second operating body formed of the crossbar and the two connecting legs is easy to hold with hand.

In some embodiments, the test tool with a profiling connector further includes:

two abutting blocks, where the first ends of the two abutting blocks are respectively connected with the second end of the first operating body, and the second ends thereof extend in a direction toward the connecting legs and abut against the connecting legs; in which the two guide pillars are respectively connected with the two abutting blocks. In such a design, the two abutting blocks can protect the guide pillars to prevent the connecting legs of the second operating body from abutting against the guide pillars when the tooling is not operating, i.e., in the initial state, which causes deformation of the guide pillars and affects the guiding accuracy.

In some embodiments, the elastic member is an elastic plunger, a spring or a leaf spring.

In some embodiments, the test tool with a profiling connector further includes:

a first fastener that is connected with the first operating body, has an accommodating space in the middle, and has a plurality of jacks communicating with the accommodating space at its first end;

In which the profiling connector is connected with the first end of the first fastener, and the elastic probe extends into the accommodating space through the jack.

Through the arrangement of the first fastener, it is easy to connect the profiling connector with the first operating body, meanwhile, an accommodating space is provided in the first fastener, which can facilitate connection of the elastic probe of the profiling connector to the wire of the testing equipment.

In some embodiments, the first fastener is connected with a side face of the first operating body facing the second operating body, the first end of the first fastener is aligned with the second end of the first operating body, and a lead wire channel communicating with the accommodating space is provided at the second end of the first fastener opposite to the first end. By providing the lead wire channel at the second end of the first fastener, it is convenient to lead out the wire connected with the elastic probe.

In some embodiments, the test tool with a profiling connector further includes:

a second fastener connected with the first fastener;

in which the first end of the first fastener is inserted to and mated with the tail end of the profiling connector, a first clamping portion is provided on one side of the profiling connector, a second clamping portion is provided on the second fastener, and the first clamping portion is clamped with the second clamping portion.

The second fastener is provided to fasten the profiling connector to the first fastener by clamping, which facilitates subsequent disassembly and maintenance.

In some embodiments, steps are provided on opposite sides of the first end of the first fastener, a groove is provided at the tail end of the profiling connector, and the groove is mated with the steps; and a stepped block protruding from one side of the tail end of the profiling connector forms a first clamping portion, and the second clamping portion is a clamping slot on the second fastener.

In such a design, the connection between the profiling connector and the first fastener is simple and convenient, and the clamping between the profiling connector and the second fastener is convenient and fast and the clamping structure is simple and easy to form, enabling desirable stability after connection.

In a second aspect, the technical solution adopted in the embodiment of the present application is: a battery testing method using the test tool with a profiling connector described above; the battery testing method specifically includes:

providing a battery having a socket; and inserting the profiling connector into the socket by holding the operating portion with hand, with the elastic probe abutting against and electrically connected with a probe of the socket.

In the technical solution of the embodiment of the present application, the first end of the operating portion can be used for hand-holding, and a profiling connector is provided at the second end of the operating portion, so as to avoid directly operating the connector with a small structure by hand. The profiling connector can be inserted into the socket to be detected and plugged by holding the operating portion with hand, so that the staff can conveniently apply force to plug the profiling connector in the socket, and the force application at this time is done by the whole hand instead of fingers acting on the connector, which solves the problem of injury to fingers of the staff effectively. Meanwhile, an elastic probe is provided in the jack of the profiling connector, and after the profiling connector is inserted into the socket to be detected and plugged, the elastic probe elastically abuts against the probe of the socket, thus changing the original sliding friction between the probe of the connector and the probe of the socket into elastic abutment, effectively avoiding damage to the profiling connector caused by repeated plugging and unplugging, improving the service life and reducing the usage cost.

The description above is merely an overview of the technical solutions of embodiments the present application. In order to make the technical means of the embodiments of the present application more clearly understandable so that the technical means can be implemented according to the content of the specification and to make the above and other objectives, features and advantages of the embodiments of the present application more comprehensible, specific implementations of the present application are exemplified below.

DESCRIPTION OF DRAWINGS

In order to illustrate the technical solutions of the embodiments of the present application more clearly, the drawings required in the embodiments of the present application shall be described briefly below. Obviously, the drawings described below are only some embodiments of the present application. For those of ordinary skill in the art, other drawings can also be obtained according to the drawings without any creative effort.

Various other advantages and benefits will become apparent to those of ordinary skill in the art upon reading the following detailed description of some implementations. The drawings are intended for the purpose of illustrating some implementations only and shall not be considered as limitation to the present application. Also, the same components are denoted by the same reference numerals throughout the drawings. In the drawings.

Reference numerals in Detailed Description:
operating portion 1, first operating body 11, second operating body 12, connecting leg 121, hook 1211, second hinge ring 1212, crossbar 122, elastic member 13, hinge block 14, first hinge ring 141, rotating shaft 15;
profiling connector 2, elastic probe 21, first clamping portion 22, groove 23;
guide pillar 3, abutting block 4;
first fastener 5, accommodating space 51, jack 52, lead wire channel 53, step 54.
second fastener 6, second clamping portion 61;
socket 7; module frame 8.

DETAILED DESCRIPTION

Embodiments of the technical solutions of the present application will be described in detail below in conjunction with the drawings. The following embodiments are merely intended to illustrate the technical solutions of the present application more clearly, and therefore are only used as examples and shall not be used to limit the scope of protection of the present application.

Unless otherwise defined, all technical and scientific terms used herein have the same meaning as commonly understood by those skilled in the art belonging to the technical field of the present application; the terms used herein are intended only for the purpose of describing specific embodiments and are not intended to limit the present application; the terms "including" and "having" and any variations thereof in the specification and the claims of the present application and in the brief description of the drawings above are intended to cover non-exclusive inclusion.

In the description of the embodiments of the present application, the technical terms "first", "second", and the like are used only to distinguish between different objects, and shall not be understood as indicating or implying relative importance or implicitly specifying the number, particular order, or primary and secondary relation of the technical features indicated. In the description of the embodiments of the present application, unless otherwise explicitly and specifically defined, the phrase "a plurality of" means two or more.

Reference herein to "an embodiment" means that a particular feature, structure, or characteristic described in connection with the embodiment can be included in at least one embodiment of the present application. The appearance of this phrase in various places in the specification does not necessarily refer to the same embodiment, nor does it refer to a separate or alternative embodiment that is mutually exclusive with other embodiments. It is explicitly and implicitly understood by those skilled in the art that the embodiments described herein may be combined with other embodiments.

In the description of the embodiments of the present application, the term "and/or" is only an associative relationship for describing associated objects, indicating that there may be three relationships. For example, A and/or B may represent three cases: A alone, both A and B, and B alone. In addition, the character "/" herein generally means that the associated objects before and after it are in an "or" relationship.

In the description of the embodiments of the present application, the term "a plurality of" refers to two or more (including two), and similarly, "multiple groups" refers to two or more (including two) groups, and "multiple sheets" refers to two or more (including two) sheets.

In the description of the embodiments of the present application, the orientation or position relationship indicated by the technical terms "central", "longitudinal", "transverse", "length", "width", "thickness", "upper", "lower", "front", "back", "left", "right", "vertical", "horizontal", "top", "bottom", "inner", "outer", "clockwise", "counterclockwise", "axial", "radial", "circumferential", etc. are based on the orientation or position relationship shown in the drawings and are intended to facilitate the description of the embodiments of the present application and simplify the description only, rather than indicating or implying that the device or element referred to must have a particular orientation or be constructed and operated in a particular orientation, and therefore are not to be interpreted as limitations on the embodiments of the present application.

In the description of the embodiments of the present application, unless otherwise expressly specified and defined, the technical terms "mount", "join", "connect", "fix", etc. should be understood in a broad sense, such as, a fixed connection, a detachable connection, or an integral connection; a mechanical connection, or an electrical connection; a direct connection, an indirect connection through an intermediate medium, an internal communication between two elements, or interaction between two elements. For those of ordinary skill in the art, the specific meanings of the above terms in the embodiments of the present application can be understood according to specific situations.

At present, with the development of international and domestic markets, power batteries are increasingly used. The power batteries are used in energy storage power source systems such as hydraulic, thermal, wind and solar power stations as well as in electric vehicles such as electric bicycles, electric motorcycles and electric cars, and military equipment and aerospace fields. With the continuous expansion of the application field of the power batteries, the market demand is also constantly expanding.

The inventor has noted that the power batteries should not only have good power storage and discharge functions, but also ensure safe operation during work, that is, it is needed to ensure that the voltage and temperature of the battery module in the power batteries are within a safe range during operation. Therefore, a standard socket capable of collecting voltage and temperature is provided on the battery module, and the voltage and temperature of the battery module can be detected in real time by connection with the socket. To ensure the safety of the battery module during operation, it is needed to detect the voltage and temperature of the battery module when it is working, that is, when charging and discharging, and to detect the effect of connection of the socket with the battery module before the power battery leaves the factory. In some cases, the detection of the voltage and temperature of the battery module before leaving the factory includes plugging a standard connector that matches the socket in the socket, then obtaining the voltage and temperature of the battery module during operation through the detection settings, and determining whether the socket is effectively connected with the battery module.

As the plugging of the standard connector in the socket is very tight, usually with a fit tolerance of <±0.2 mm, it is very difficult to plug and unplug manually, especially when testing mass-produced battery modules. Repeated plugging and unplugging will cause injury to the fingers of the operator; in addition, the probes in the standard connector and the socket are fitted to each other by sliding, and the service life of the connector generally includes 30 times of plugging, which is not suitable for testing of mass-produced battery modules, and will lead to frequent replacement of connectors, resulting in increased usage costs.

In order to solve the above-mentioned problems, the inventor found through research that an easy-to-operate tooling can be designed to carry out the operation of plugging the above-mentioned connector in the socket, so as to solve the problem that existing connector plugging causes injury to the fingers of the staff; meanwhile, a profiling connector of a long service life can be provided in the tool. For example, the shell is made of wear-resistant materials, and an elastic probe is provided in the profiling connector to convert the sliding friction contact between the probe of the connector and the probe of the socket into elastic abutment contact, thereby solving the problem of increased usage costs due to insufficient service life of the connector.

The test tool with a profiling connector disclosed in the embodiment of the present application is used in enterprises for mass-production of batteries as well as in enterprises for non-mass production of batteries, and also in enterprises that produce other electronic products, as long as it is used in a working environment involving repeated plugging and unplugging of a connector in and out of a socket for testing.

Figure 1:
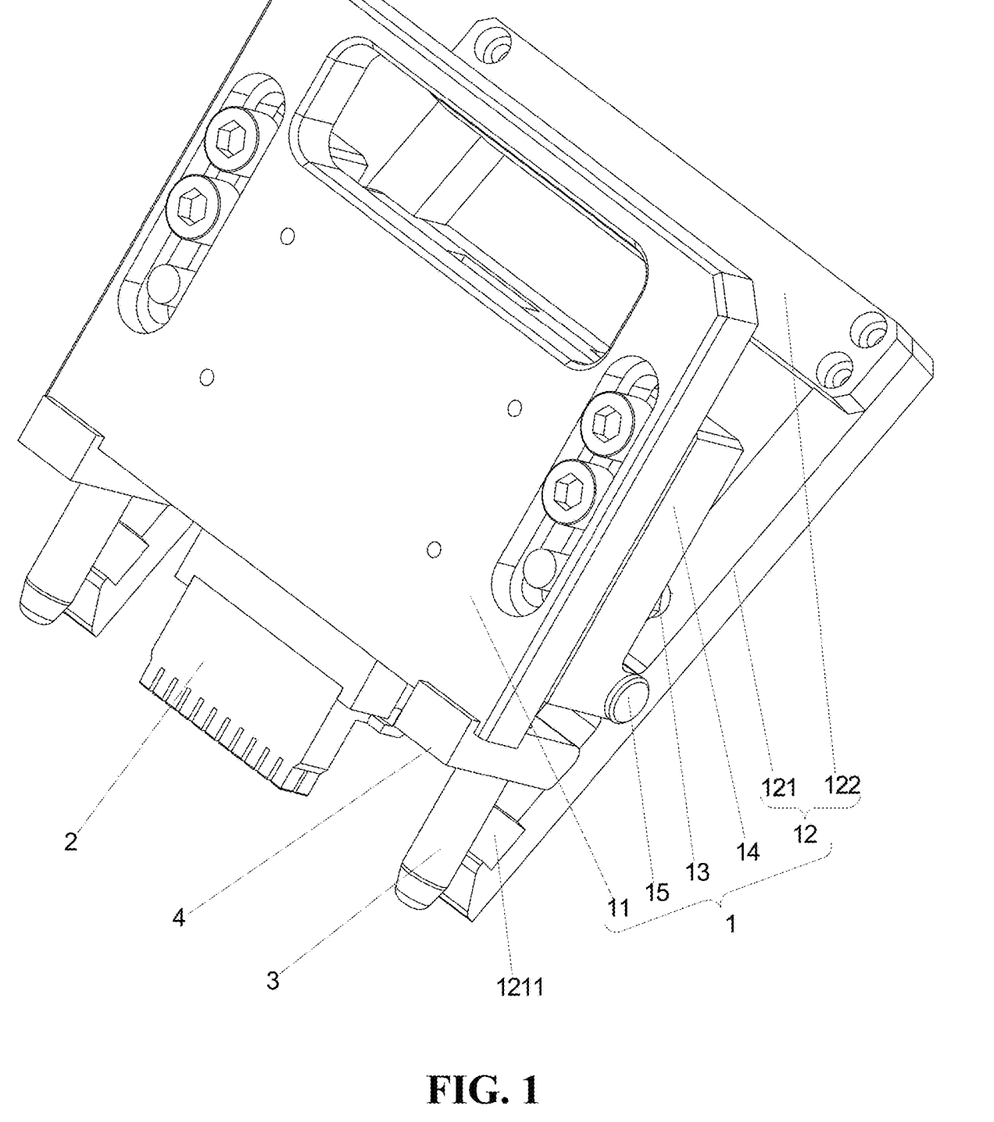
FIG. 1 is a schematic structural view of a test tool with a profiling connector according to some embodiments of the present application viewed from a first perspective.
Figure 2:
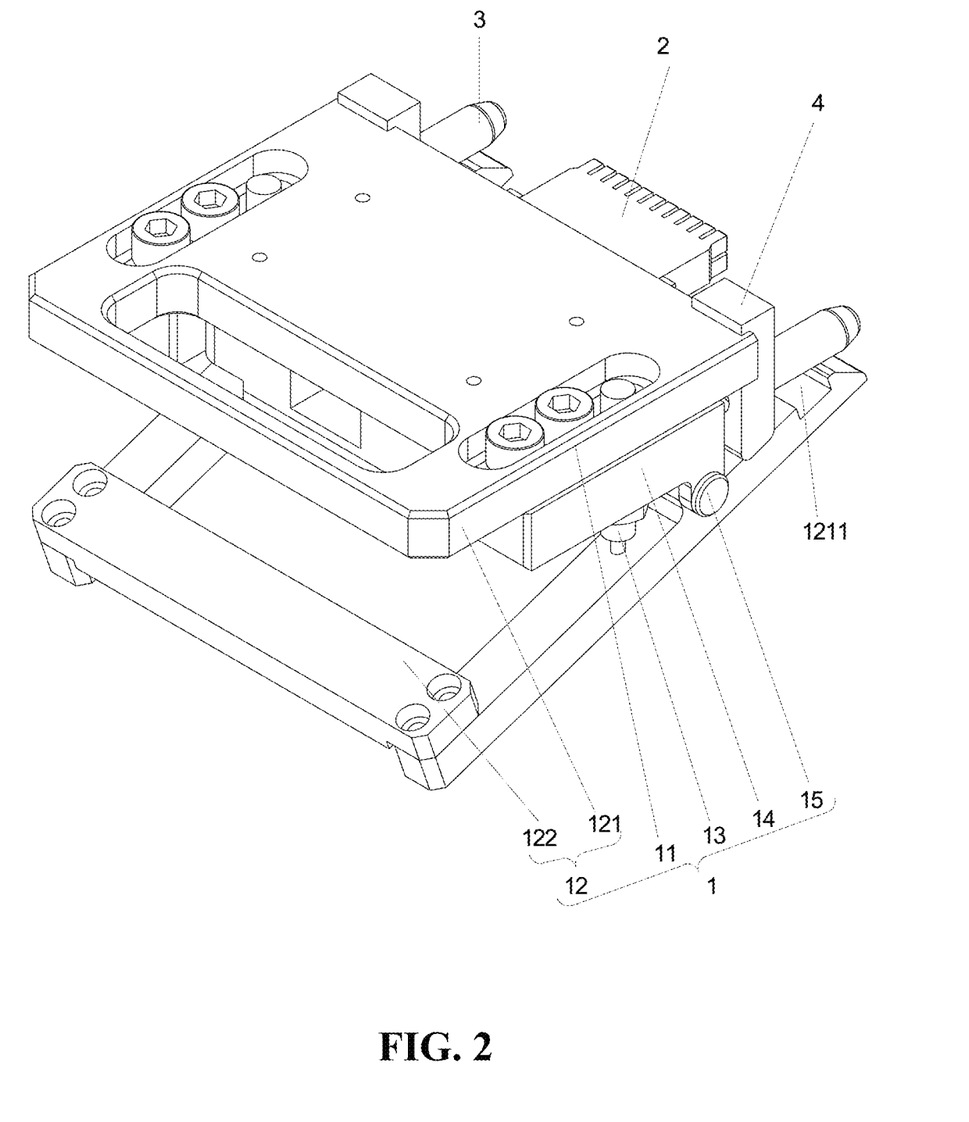
FIG. 2 is a schematic structural view of a test tool with a profiling connector according to some embodiments of the present application viewed from a second perspective.
Figure 3:
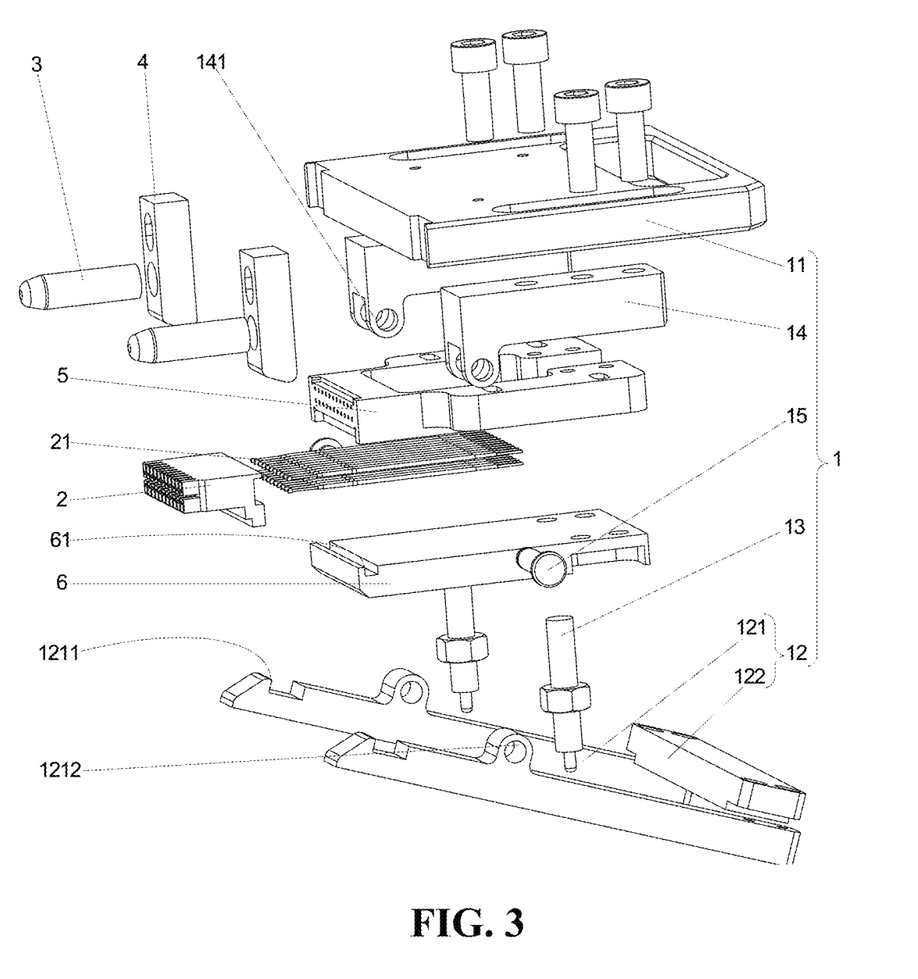
FIG. 3 is a schematic exploded structural view of a test tool with a profiling connector according to some embodiments of the present application.

As shown in FIGS. 1 to 3, according to some embodiments of the present application, an embodiment of the present application provides a test tool with a profiling connector, including:

an operating portion 1, a first end of the operating portion 1 being used for hand-holding; a profiling connector 2 adapted to a socket 7 to be detected and plugged, where an elastic probe 21 is provided in the jack of the profiling connector 2, and the profiling connector 2 is arranged at a second end of the operating portion 1 opposite to the first end. The profiling connector 2 can be inserted into the socket 7 by holding the operating portion 1 with hand, with the elastic probe 21 abutting against and electrically connected with a probe of the socket 7.

The operating portion 1 is the portion for the staff to operate of the test tool with a profiling connector in the embodiment of the present application. The operating portion 1 may be made of metal materials, such as stainless steel, aluminum alloy, magnesium alloy, etc., and may also be made of plastic materials meeting the use strength requirement. The holding structure at the first end of the operating portion 1 may be provided with a ring-shaped handle, a rod-shaped handle, or the like, and the connection between the second end of the operating portion 1 and the profiling connector 2 may be made through bolt connection or through clamping with a clamping structure.

The profiling connector 2 is so called because the shape and structure of the profiling connector 2 can be adapted according to the structure of the socket 7 to be detected and plugged, so as to meet the requirements of plugging and matching of sockets 7 with various structures. The profiling connector 2 may be made of friction-resistant materials, such as polyetheretherketone. However, it should be noted that an elastic probe 21 that is commercially available is used as the probe in the jack of the profiling connector 2. The elastic probe 21 can be elastically deformed upon contact with the probe of the socket 7 and then maintain the state of elastic abutment, thereby converting the original sliding plugging between the probes into elastic abutment connection. The elastic probe 21 of the profiling connector 2 can be electrically connected with the detection equipment through connection wires, so as to send the voltage and temperature signals obtained through detection to the detection equipment.

In the technical solution of the embodiment of the present application, the first end of the operating portion 1 can be used for hand-holding, and a profiling connector 2 is provided at the second end of the operating portion 1, so as to avoid directly operating the connector with a small structure by hand. The profiling connector 2 can be inserted into the socket 7 to be detected and plugged by holding the operating portion 1 with hand, so that the staff can conveniently apply force to plug the profiling connector 2 in the socket 7, and the force application at this time is done by the whole hand instead of fingers acting on the connector, which solves the problem of injury to fingers of the staff effectively. Meanwhile, an elastic probe 21 is provided in the jack of the profiling connector 2, and after the profiling connector 2 is inserted into the socket 7 to be detected and tested, the elastic probe 21 elastically abuts against the probe of the socket 7, thus changing the original sliding friction between the probe of the connector and the probe of the socket 7 into elastic abutment, effectively avoiding damage to the profiling connector 2 caused by repeated plugging and unplugging, improving the service life and reducing the usage cost.

As shown in FIGS. 1 to 3, according to some embodiments of the present application, optionally, the test tool with a profiling connector further includes two guide pillars 3 connected with the second end of the operating portion 1 respectively, and the two guide pillars 3 are respectively arranged on two sides of the profiling connector 2.

Figure 4:
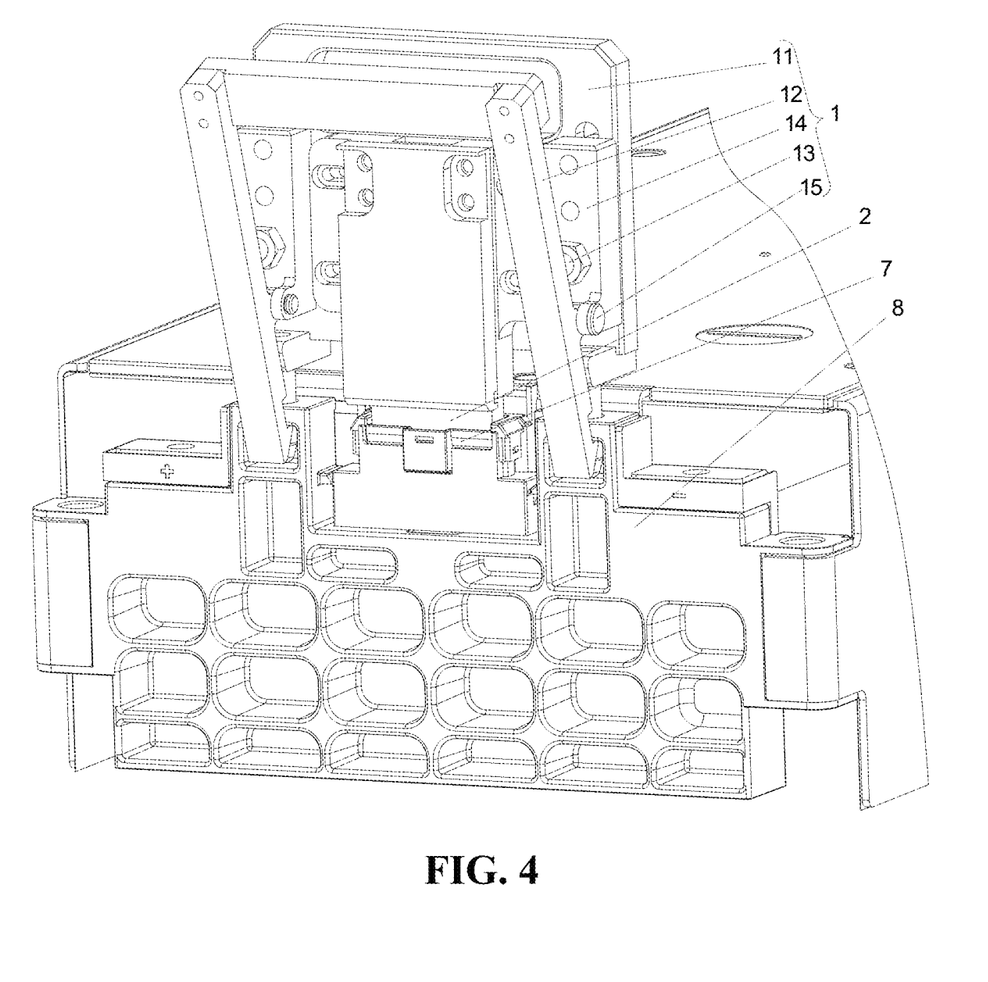
FIG. 4 is a schematic structural view of the connection between the test tool with a profiling connector and the socket and the module frame according to some embodiments of the present application.
Figure 5:
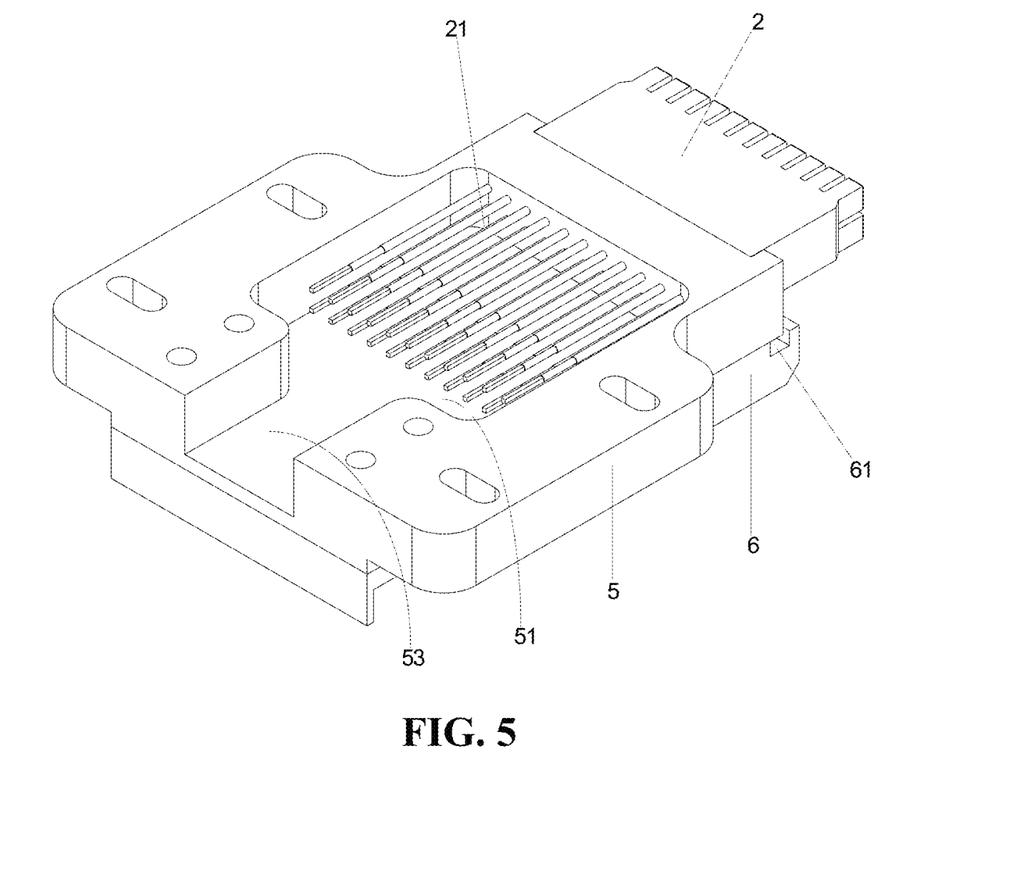
FIG. 5 is a schematic structural view of the connection between the profiling connector and the first fastener and the second fastener according to some embodiments of the present application viewed from a first perspective.
Figure 6:
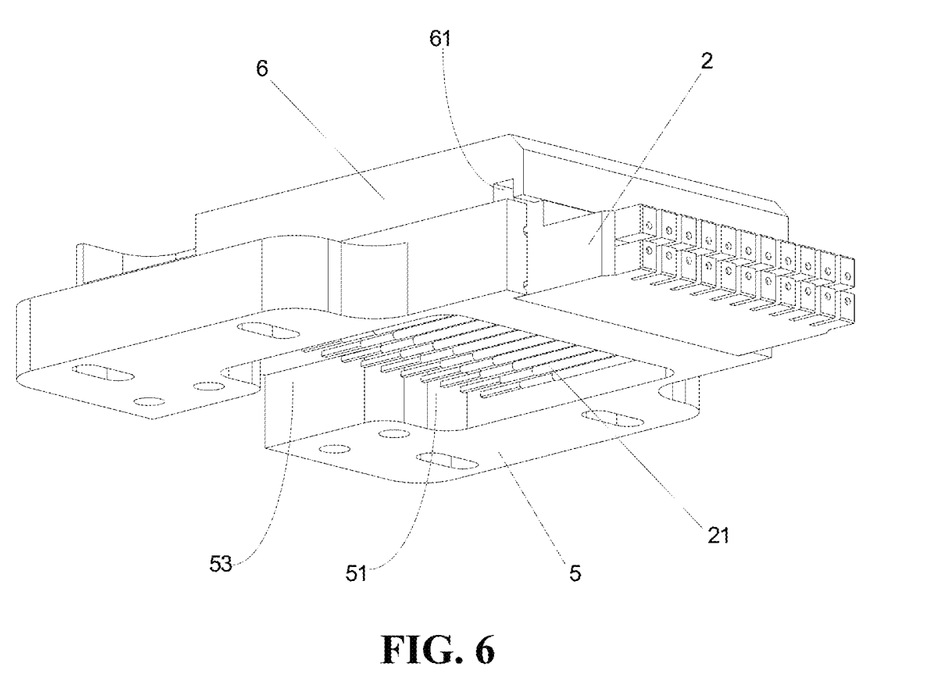
FIG. 6 is a schematic structural view of the connection between the profiling connector and the first fastener and the second fastener according to some embodiments of the present application viewed from a second perspective.
Figure 7:
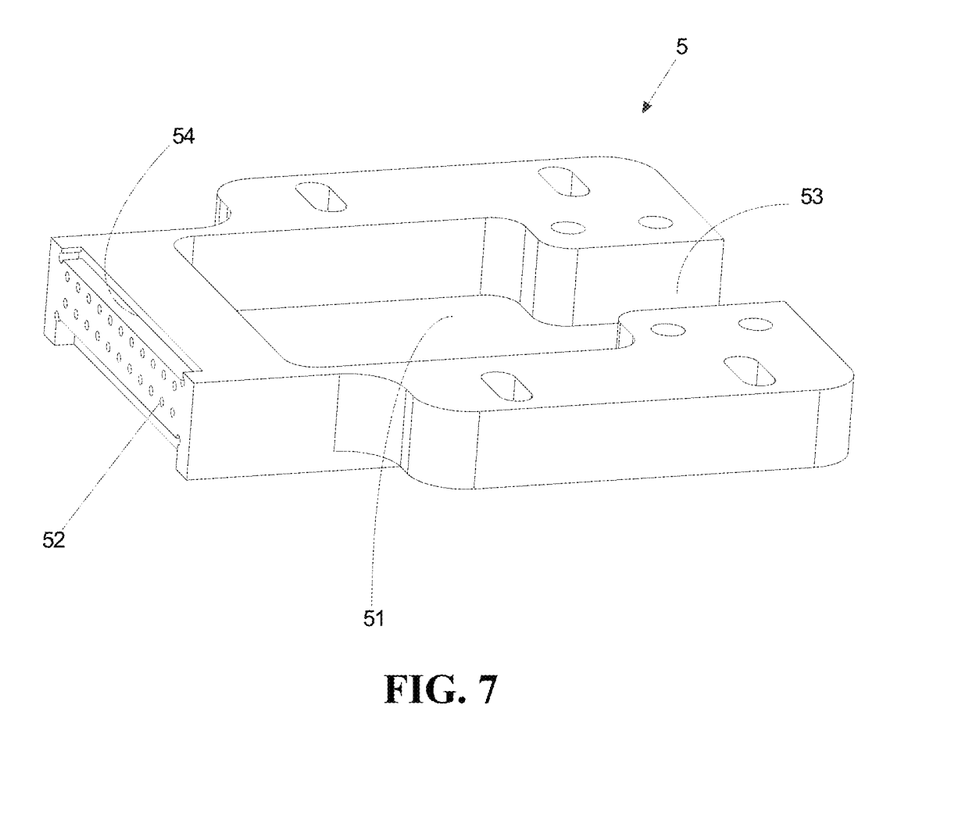
FIG. 7 is a schematic structural view of a first fastener according to some embodiments of the present application viewed from a first perspective.
Figure 8:
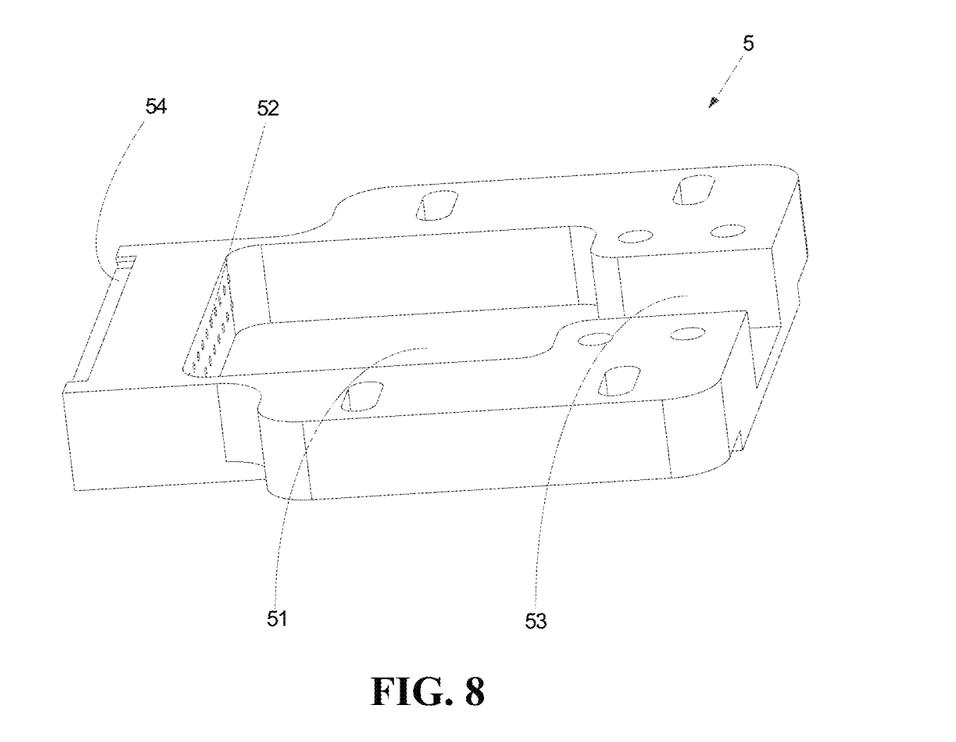
FIG. 8 is a schematic structural view of a first fastener according to some embodiments of the present application viewed from a second perspective.
Figure 9:
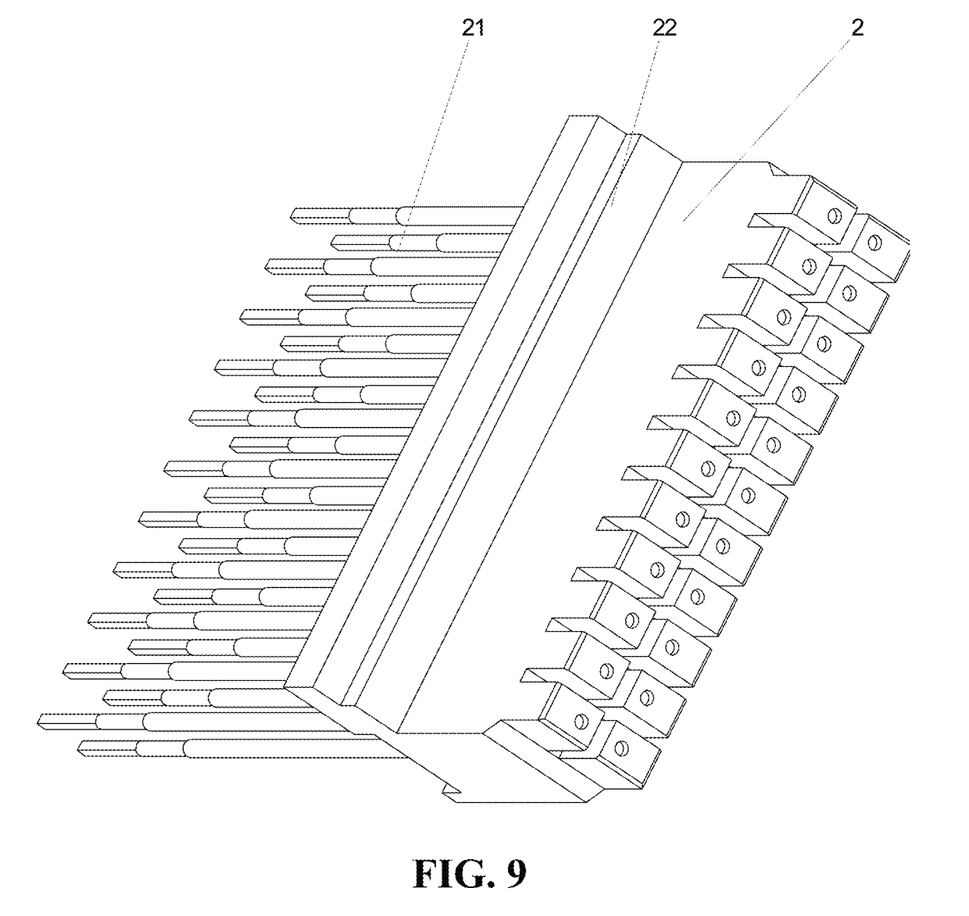
FIG. 9 is a schematic structural view of a profiling connector according to some embodiments of the present application viewed from a first perspective.
Figure 10:
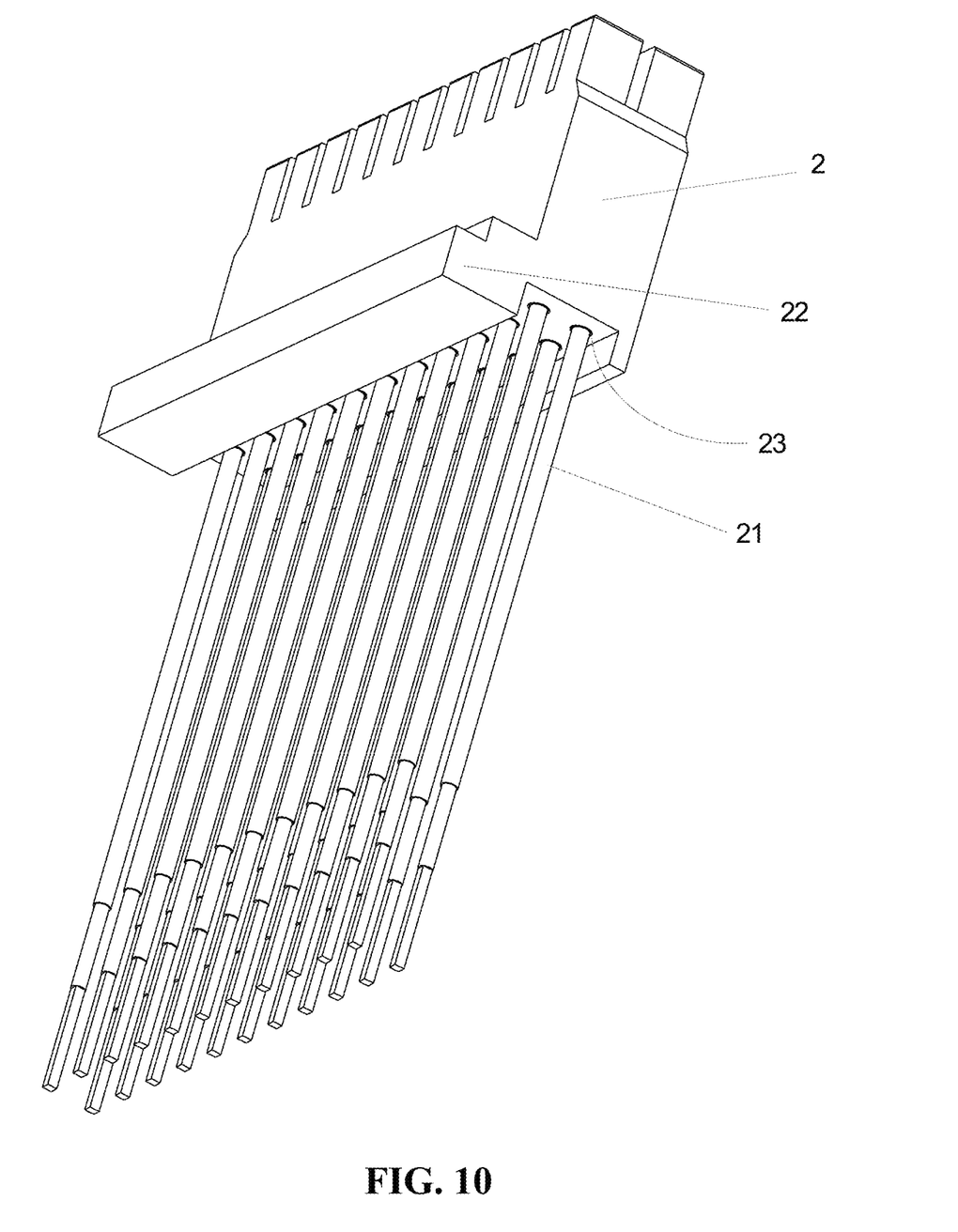
FIG. 10 is a schematic structural view of a profiling connector according to some embodiments of the present application viewed from a second perspective.

Specifically, the guide pillar 3 may be a cylinder, and the distance by which the guide pillar 3 protrudes from the end portion of the second end of the operating portion 1 is greater than the distance by which the profiling connector 2 protrudes from the end portion of the second end of the operating portion 1, so that when the staff plugs the profiling connector 2 in the socket 7 by holding the operating portion 1, as shown in FIG. 4, the two guide pillars 3 are first plugged in the guide holes on the module frame 8 of the battery module (which may be the original process holes on the module frame 8), and then provide guidance for inserting the profiling connector 2 into the socket 7. It should be noted that there are in some embodiments two guide pillars 3 that are distributed on two sides of the profiling connector 2 in order to achieve a good guiding effect.

In this embodiment, by adding the guide pillars 3, when the tooling is operated to plug the profiling connector 2 in the socket 7, the guide pillars 3 are plugged in the guide jacks on the module frame 8 of the battery module first, so as to achieve guidance for inserting the profiling connector 2 into the socket 7, providing the effect of facilitating plugging.

As shown in FIGS. 1 to 3, according to some embodiments of the present application, optionally, the operating portion 1 includes: a first operating body 11, a second operating body 12 and an elastic member 13; the first end of the first operating body 11 is used for hand-holding, and the second end is provided with the profiling connector 2; the first end of the second operating body 12 is used for hand-holding, and the second end is provided with a hook 1211, and the position of the second operating body 12 near the second end is hinged with the second end of the first operating body 11, and the hook 1211 is used to be clamped with the battery module when the profiling connector 2 is inserted into the socket 7; the elastic member 13 is arranged between the first operating body 11 and the second operating body 12 so that a preset included angle is formed between the first operating body 11 and the second operating body 12, and is used to provide resilience.

Specifically, the combination of the first operating body 11, the second operating body 12 and the elastic member 13 forms a gripping body structure capable of elastic resilience. The first end of the first operating body 11 may be provided as a ring-shaped structure, or a rod-shaped structure that is convenient to hand-hold, or a structure similar to other existing handle structures that are convenient to hand-hold. The connection between the second end and the profiling connector 2 may be connection through bolts or may be clamping connection. For example, the clamping connection may include clamping the profiling connector 2 with a clamping ring provided at the second end of the first operating body 11, or by clamping of a clamping block provided on the profiling connector 2 to a clamping slot provided at the second end of the first operating body 11.

The first end of the second operating body 12 may be provided to have the same structure as the first end of the first operating body 11, as long as it is convenient to hand-hold, and details thereof will not be repeated here. The hook 1211 at the second end of the second operating body 12 may be a hook 1211 in the form of a groove matching the hole in the module frame 8 of the battery module. By hinging the position of the second operating body 12 near the second end with the second end of the first operating body 11, it is ensured that the two can rotate relative to each other, while as shown in FIG. 4, the hook 1211 at the second end of the second operating body 12 is clamped with the hole in the module frame 8.

The elastic member 13 may be any form of component that generates an elastic abutting force, such as an elastic plunger, a spring, a leaf spring, or the like, and the elastic member 13 can be arranged between the first operating body 11 and the second operating body 12 by conventional means. For these conventional means, reference may be made to existing techniques, so description thereof will not be repeated here.

As shown in FIG. 4, when inserting the profiling connector 2 into the socket 7 in the embodiment of the present application, the operator can apply a gripping force to the first operating body 11 and the second operating body 12, so that the first operating body 11 and the second operating body 12 rotate and approach relative to each other. At this time, the hook 1211 at the second end of the second operating body 12 is relatively far away from the profiling connector 2. After the staff plugs the profiling connector 2 in the socket 7 by holding the first operating portion 1, the staff can release the gripping force applied to the first operating body 11 and the second operating body 12, and the hook 1211 at the second end of the second operating body 12 is clamped with the module frame 8 of the battery module. Under the action of the elastic member 13, the elastic force acts on the first operating body 11 and the second operating body 12 respectively, so that the profiling connector 2 at the second end of the first operating body 11 is inserted into the socket 7, with the hook 1211 of the second operating body 12 being clamped with the module frame 8, so that the first operating body 11 and the second operating body 12 are in a state of gripping the module frame 8, and then the test tool with the profiling connector and the battery module are in a state of relatively stable connection, thereby ensuring stable connection between the profiling connector 2 and the socket 7.

As shown in FIGS. 1 to 3, according to some embodiments of the present application, optionally, a hinge block 14 is connected with a first side face of the first operating body 11, the first end of the hinge block 14 is aligned with the second end of the first operating body 11 and is provided with a first hinge ring 141, and the second operating body 12 is provided with a second hinge ring 1212, the first hinge ring 141 and the second hinge ring 1212 being hinged via a rotating shaft 15.

Specifically, the arrangement of the hinge block 14 can simplify the structure of the first operating body 11. At this time, the first operating body 11 can be provided in a plate shape as a whole, and then the hinge block 14 is connected with the first side face of the operating body 11 through bolt connection. Meanwhile, after the second hinge ring 1212 is provided on the second operating body 12, hinging of the first operating body 11 with the second operating body 12 can be realized conveniently and quickly.

As shown in FIGS. 1 to 3, according to some embodiments of the present application, optionally, there are two hinge blocks 14 arranged at an interval. The second operating body 12 includes two connecting legs 121, the second hinge rings 1212 are respectively arranged on the two connecting legs 121, and the hooks 1211 are arranged at the first ends of the connecting legs 121. The two second hinge rings 1212 are respectively hinged with the first hinge rings 141 of the two hinge blocks 14. The second operating body 12 further includes a crossbar 122, and two ends of the crossbar are respectively connected with the second ends of the two connecting legs to form a structure for hand-holding.

Specifically, the second operating body 12 is provided in a frame shape formed of a crossbar 122 and two connecting legs 121, so that the crossbar 122 is convenient for the staff to hand-hold, and the first ends of the two connecting legs 121 are convenient for providing the hook 1211, while the two separate connecting legs 121 facilitate the clamping connection between the hook 1211 and the module frame 8. The second operating body 12 in the form of connecting legs 121 can reduce weight and facilitate operation.

It should be noted that, in some embodiments, a suitable distance is kept between the two connecting legs 121, so that the two connecting legs 121 can be arranged directly facing the two guide pillars 3. In this way, after the guide pillar 3 is inserted in the guide hole of the module frame 8, the profiling connector 2 is inserted into the socket 7, and the hook 1211 of the connecting leg 121 is clamped with the module frame 8, under the action of the elastic member 13, the first operating body 11 and the second operating body 12 are in a state of gripping the module frame 8, and then the test tool with the profiling connector and the battery module are in a state of relatively stable connection, thereby ensuring stable connection between the profiling connector 2 and the socket 7.

As shown in FIGS. 1 to 3, according to some embodiments of the present application, optionally, the test tool with a profiling connector further includes:

two abutting blocks 4. The first ends of the two abutting blocks 4 are respectively connected with the second end of the first operating body 11, and the second ends thereof extend in a direction toward the connecting legs 121 and abut against the connecting legs 121. The two guide pillars 3 are respectively connected with the two abutting blocks 4. The two abutting blocks 4 can be connected with the second end of the first operating body 11 by bolts, and the two guide pillars 3 can be arranged in the preset connection holes or slots of the two abutting blocks 4 by way of interference fit.

In such a design, the two abutting blocks 4 can protect the guide pillars 3 to prevent the connecting legs 121 of the second operating body 12 from abutting against the guide pillars 3 when the tooling is not operating, i.e., in the initial state, which causes deformation of the guide pillars 3 and affects the guiding accuracy.

As shown in FIGS. 3 and 5 to 8, according to some embodiments of the present application, optionally, the test tool with a profiling connector further includes:

a first fastener 5 that is connected with the first operating body 11, has an accommodating space 51 in the middle, and has a plurality of jacks 52 communicating with the accommodating space 51 at its first end. The profiling connector 2 is connected with the first end of the first fastener 5, and the elastic probe 21 extends into the accommodating space 51 through the jack 52.

Specifically, the first operating body 11 may be in the shape of a plate as a whole, and the first fastener 5 may also be in the shape of a plate as a whole, so as to facilitating connection of the two. The connection between the two may be connection through bolts. The accommodating space 51 provided on the first fastener 5 may be a groove provided on a side face of the first fastening body of the plate body structure, or a hollow that runs through both side faces. The distribution pattern of the plurality of jacks 52 provided at the first end of the first fastener 5 needs to match with the distribution pattern of the jacks 52 of the profiling connector 2.

The arrangement of the first fastener 5 facilitates connection of the profiling connector 2 with the first operating body 11, while the accommodating space 51 is provided in the first fastener 5, which can facilitate connection of the elastic probe 21 of the profiling connector 2 with the wire of the testing equipment.

Further, the first fastener 5 is connected with a side face of the first operating body 11 facing the second operating body 12, the first end of the first fastener 5 is aligned with the second end of the first operating body 11, and a lead wire channel 53 communicating with the accommodating space 51 is provided at the second end of the first fastener 5 opposite to the first end.

By arranging the lead wire channel 53 at the second end of the first fastener 5, it is convenient to lead out the wire connected with the elastic probe 21.

As shown in FIGS. 3, 5, 6, 9 and 10, according to some embodiments of the present application, optionally, the test tool with a profiling connector further includes:

a second fastener 6 connected with the first fastener 5. The first end of the first fastener 5 is inserted to and mated with the tail end of the profiling connector 2, a first clamping portion 22 is provided on one side of the profiling connector 2, a second clamping portion 61 is provided on the second fastener 6, and the first clamping portion 22 is clamped with the second clamping portion 61.

Specifically, the second fastener 6 can be adapted to the first fastener 5, that is, when the first fastener 5 is in the shape of a plate as a whole, the second fastener 6 may also be provided in a plate shape and then be connected with the first fastener 5 by bolt fixing. The second fastener 6 is provided to fasten the profiling connector 2 to the first fastener 5 by clamping, which is convenient for subsequent disassembly and maintenance.

Further, steps 54 are provided on opposite sides of the first end of the first fastener 5, and a groove 23 is provided at the tail end of the profiling connector 2, and the groove 23 is mated with the steps 54. A stepped block protruding from one side of the tail end of the profiling connector 2 forms a first clamping portion 22, and the second clamping portion 61 is a clamping slot on the second fastener 6.

In such a design, the connection between the profiling connector 2 and the first fastener 5 is simple and convenient, and the clamping between the profiling connector 2 and the second fastener 6 is convenient and fast, and the clamping structure is simple and easy to form, enabling desirable stability after connection.

According to some embodiments of the present application, the embodiment of the present application provides a battery testing method using the above-mentioned test tool with a profiling connector. The battery testing method specifically includes:

providing a battery having a socket 7; and inserting the profiling connector 2 into the socket 7 by holding the operating portion 1 with hand, with the elastic probe 21 abutting against and electrically connected with a probe of the socket 7.

In the technical solution of the embodiment of the present application, the first end of the operating portion 1 can be used for hand-holding, and a profiling connector 2 is provided at the second end of the operating portion 1, so as to avoid directly operating the connector with a small structure by hand. The profiling connector 2 can be inserted into the socket 7 to be detected and plugged by holding the operating portion 1 with hand, so that the staff can conveniently apply force to plug the profiling connector 2 in the socket 7, and the force application at this time is done by the whole hand instead of fingers acting on the connector, which solves the problem of injury to fingers of the staff effectively. Meanwhile, an elastic probe 21 is provided in the jack of the profiling connector 2, and after the profiling connector 2 is inserted into the socket 7 to be detected and plugged, the elastic probe 21 elastically abuts against the probe of the socket 7, thus changing the original sliding friction between the probe of the connector and the probe of the socket 7 into elastic abutment, effectively avoiding damage to the profiling connector 2 caused by repeated plugging and unplugging, improving the service life and reducing the usage cost.

Finally, it should be noted that the above embodiments are merely used for illustrating rather than limiting the technical solutions of the present application. Although the present application has been described in detail with reference to the various embodiments above, those of ordinary skill in the art should understand that the technical solutions specified in the various embodiments above can still be modified, or some or all of the technical features therein can be equivalently substituted; and such modifications or substitutions do not cause the essence of the corresponding technical solutions to depart from the scope of the respective technical solutions of the various embodiments of the present application, which shall fall within the scope of the claims and the specification of the present application. In particular, the technical features mentioned in the various embodiments can be combined in any manner as long as there is no structural conflict. The present application is not limited to the specific embodiments disclosed herein, but rather includes all technical solutions falling within the scope of the claims.

What is claimed is:

1. A test tool, comprising:
an operating portion, a first end of the operating portion being used for hand-holding; and
a profiling connector adapted to a socket to be detected and plugged, where an elastic probe is arranged in a jack of the profiling connector, and the profiling connector is arranged at a second end of the operating portion opposite to the first end;
wherein:
the profiling connector is configured to be inserted into the socket by holding the operating portion with hand, and the elastic probe abuts against and is electrically connected with a probe of the socket;
the operating portion comprises a first operating body, a second operating body, and an elastic member;
a first end of the first operating body is used for hand-holding, and a second end of the first operating body is provided with the profiling connector;
a first end of the second operating body is used for hand-holding, and a second end of the second operating body is provided with a hook;
a position of the second operating body near the second end is hinged with the second end of the first operating body, and the hook is used to be clamped with a battery module when the profiling connector is inserted in the socket; and
the elastic member is arranged between the first operating body and the second operating body so that a preset included angle is formed between the first operating body and the second operating body, and is used to provide resilience.

2. The test tool of claim 1, further comprising:
two guide pillars connected with the second end of the operating portion and respectively arranged on two sides of the profiling connector.

3. The test tool of claim 1, wherein:
a hinge block is connected with a first side face of the first operating body, a first end of the hinge block is aligned with the second end of the first operating body and is provided with a first hinge ring, and the second operating body is provided with a second hinge ring, the first hinge ring and the second hinge ring being hinged via a rotating shaft.

4. The test tool according to claim 3, wherein:
the hinge block is one of two hinge blocks arranged at an interval;
the second operating body comprises two connecting legs, the two connecting legs are each provided with the second hinge ring, and the hook is arranged at a first end of the connecting leg; and
the two second hinge rings are respectively hinged with the first hinge rings of the two hinge blocks.

5. The test tool of claim 4, wherein:
the second operating body further comprises a crossbar, and two ends of the crossbar are respectively connected with the second ends of the two connecting legs to form a structure for hand-holding.

6. The test tool of claim 4, further comprising:
two abutting blocks, where first ends of the two abutting blocks are connected with the second end of the first operating body, and second ends of the two abutting blocks extend toward the two connecting legs and abut against the two connecting legs;
wherein the two guide pillars are respectively connected with the two abutting blocks.

7. The test tool of claim 1, wherein:
the elastic member is an elastic plunger, a spring or a leaf spring.

8. The test tool of claim 1, further comprising:
a first fastener that is connected with the first operating body, has an accommodating space in the middle, and has a plurality of jacks communicating with the accommodating space at a first end of the accommodating space;
wherein the profiling connector is connected with the first end of the first fastener, and the elastic probe extends into the accommodating space through the jack.

9. The test tool of claim 8, wherein:
the first fastener is connected with a side face of the first operating body facing the second operating body, the first end of the first fastener is aligned with the second end of the first operating body, and a lead wire channel communicating with the accommodating space is provided at a second end of the first fastener opposite to the first end.

10. The test tool of claim 8, further comprising:
a second fastener connected with the first fastener;
wherein the first end of the first fastener is inserted to and mated with a tail end of the profiling connector, a first clamping portion is provided on one side of the profiling connector, and a second clamping portion is provided on the second fastener, the first clamping portion being clamped with the second clamping portion.

11. The test tool of claim 10, wherein:
steps are provided on opposite sides of the first end of the first fastener, a groove is provided at the tail end of the profiling connector, and the groove is mated with the steps;
a stepped block protruding from one side of the tail end of the profiling connector forms the first clamping portion, and the second clamping portion is a clamping slot on the second fastener.

12. A battery testing method using the test tool of claim 1, comprising:
   providing a battery having a socket; and
   inserting the profiling connector into the socket by holding the operating portion with hand, to cause the elastic probe to abut against and be electrically connected with a probe of the socket.

* * * * *